Aug. 11, 1925.
W. KADLETZ
1,549,135
LUGGAGE CARRIER
Filed Feb. 14, 1925    2 Sheets-Sheet 1
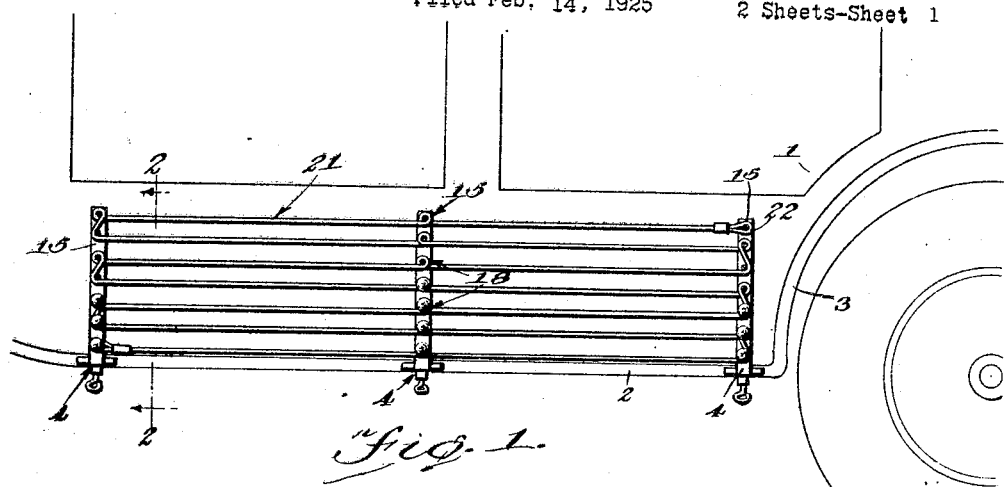
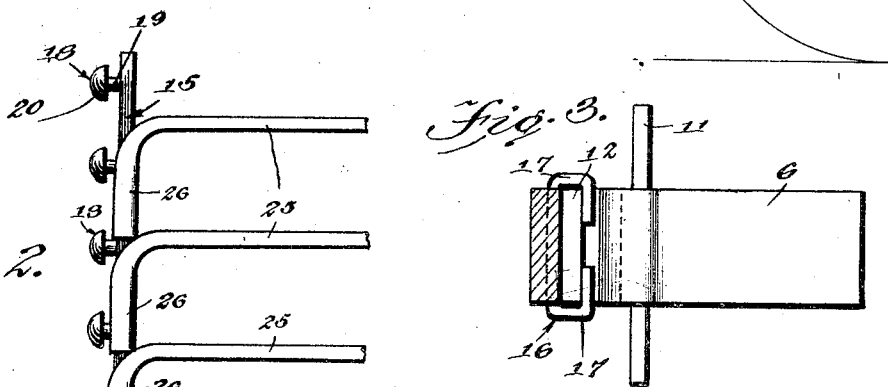
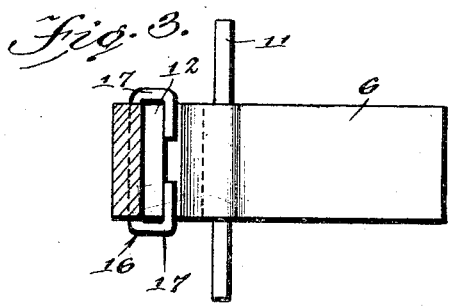
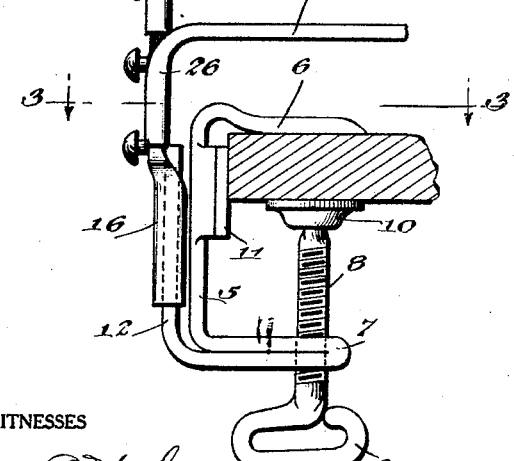
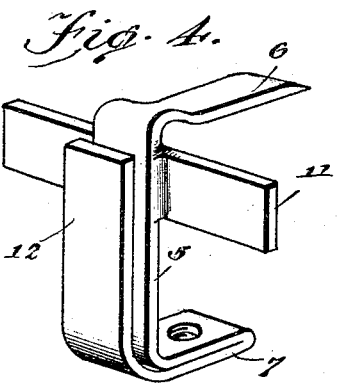
WITNESSES
INVENTOR
William Kadletz,
BY
ATTORNEYS Aug. 11, 1925.
W. KADLETZ
1,549,135
LUGGAGE CARRIER
Filed Feb. 14, 1925    2 Sheets-Sheet 2
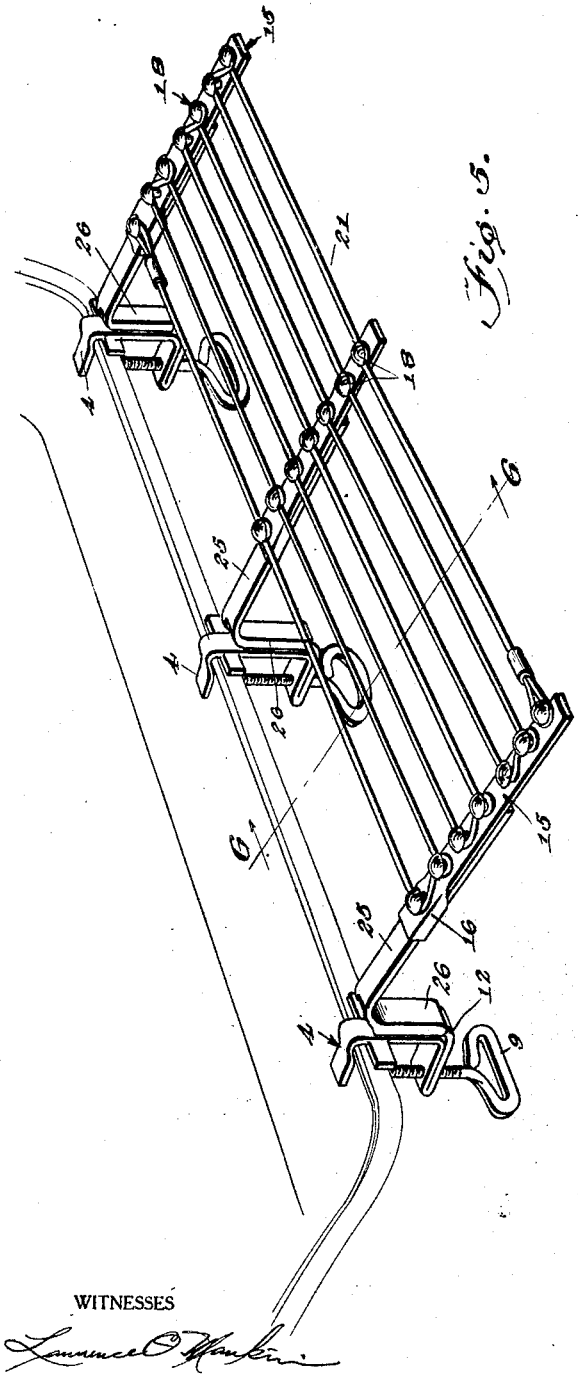
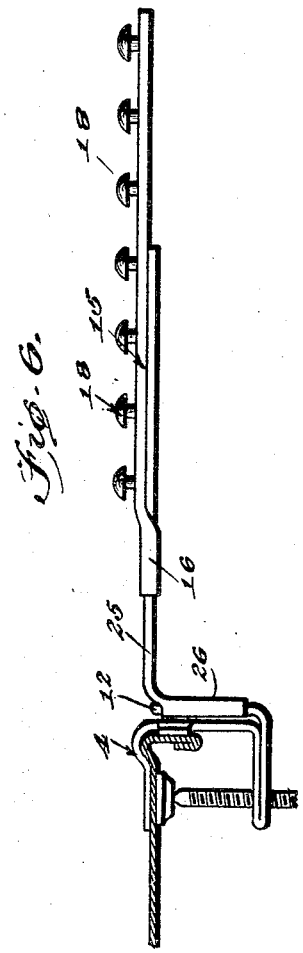
WITNESSES
INVENTOR
William Kadletz,
BY
ATTORNEYS Patented Aug. 11, 1925.

1,549,135

UNITED STATES PATENT OFFICE.

WILLIAM KADLETZ, OF SALMON, IDAHO.

LUGGAGE CARRIER.

Application filed February 14, 1925. Serial No. 9,242.

*To all whom it may concern:*

Be it known that I, WILLIAM KADLETZ, a citizen of the United States, residing at Salmon, in the county of Lemhi, State of Idaho, have invented certain new and useful Improvements in Luggage Carriers, of which the following is a specification.

This invention relates in general to luggage carriers, and more particularly to a luggage carrier which may be converted into a table or platform adapted for various uses.

The object of the invention is the provision of a luggage carrier of this character which is especially adapted for use on the running boards of automobiles or the like and which may be easily set up to provide a reliable luggage carrier of ample capacity and of such character as not to be liable to scar or damage valises or the like.

A further object is the provision of a luggage carrier having the advantages specified and which is of such construction and character that all of the parts of the same which extend above or offer an obstruction upon the running board may be easily taken down and rolled up into a compact space so that the parts taken down may be readily stored in the compartments ordinarily provided under the seats of automobiles when the luggage carrier is not in use.

A still further object is the provision of a luggage carrier of the character specified which is of simple and durable construction, reliable in operation, easy to set up and take down and adapted for comparatively inexpensive manufacture from materials and by means of facilities ordinarily available.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a fragmentary view in side elevation showing the luggage carrier set up on the running board of an automobile, Figure 2 is a view in vertical section taken on line 2—2 of Fig. 1, the rope or flexible element having omitted to simplify the illustration.

Figure 3 is a view in horizontal section on the line 3—3 of Figure 2,

Figure 4 is a detail perspective view of one of the clamps,

Figure 5 is a perspective view showing the luggage carrier converted into a table or platform, and Figure 6 is a view partly in section and partly in elevation, the section being taken in the plane of line 6—6 of Figure 5.

Referring to the drawings the numeral 1 designates generally an automobile which has a running board 2 and a rear fender 3.

The luggage carrier which constitutes the present invention comprises a plurality of clamps, designated generally at 4, and adapted to be fastened to the running board. Each clamp 4 includes a vertical member 5 having a horizontal running board engaging member 6 integrally formed with its upper end. At the lower end of the member 5 the material of the clamp is provided in two thicknesses and constitutes a horizontally extending bracket member 7 having a threaded bearing in which a clamping screw 8 is operatively engaged. The clamping screw 8 has a handle member 9 and a swiveled and universally mounted clamping plate 10. A positioning plate 11 engageable with the end of the running board is welded or otherwise suitably secured to the vertical member 5 of the clamp. The material of the clamp is extended beyond the bracket member 7 to provide a vertically disposed mounting lug 12.

Uprights, designated generally at 15, are provided, there being one upright for each clamp 4. Each upright 15 has a socket 16 integrally formed at its lower end, the sockets being designed to receive the lugs 12, whereby the uprights are supported in vertical position on the clamps. The sockets 16 are defined by angle flanges 17 provided on each of the inner edges of the uprights adjacent the lower ends of the same.

A plurality of headed studs or buttons, designated generally at 18, are provided on each upright, each stud including a shank 19 fastened to the upright and a head 20 carried by the shank.

A flexible element which preferably consists of a rope, designated generally at 21, is carried by the uprights, the rope having runs extended back and forth between the uprights and having eyes 22 engaged with certain of the studs and having its intermediate portions extended and wound around the shanks of the studs and engaged with the heads thereof. The inner surfaces of the uprights that are exposed present smooth surfaces but the major portion of the inner wall of the luggage carrier is constituted by the rope and this is a feature which is advantageous in that it precludes the possibility of valises, hand bags, or the like, becoming scarred or damaged while in a luggage carrier.

With the arrangement shown in Figure 1 one end of the luggage carrier is closed by the rear fender 3 and it is proposed to position the clamp 4 adjacent the fender 3 so close thereto that the fender will serve as one end closure. The closure for the other end of the luggage carrier preferably comprises a plurality of horizontally extending spaced bars 25 having vertically extending sockets 26 which receive an upright 15 to support the bars 25 and which are engaged with each other to maintain the bars 25 in spaced relation. The sockets 26 are constructed in the same manner as the sockets 16, these sockets 26 being also constituted of angle flanges on the edges of an angular extension of the bar 25.

With this arrangement the clamps 4 may always be left on the running board and when a luggage carrier is desired the uprights 15 are mounted on the clamps 4, the bars 25 are mounted on one of the uprights and the rope or flexible element 21 is engaged with the headed studs or buttons of the uprights. To take down the luggage carrier the uprights are disengaged from the lugs of the clamps, the bars 25 are disengaged from their uprights and laid across the runs of the rope 21 and the rope is rolled around the bars 25 and the uprights 15 to provide a compact bundle.

In order to convert the luggage carrier into a table or platform which may be used as a lunch table or for other purposes, the parts shown in Figures 1 to 4, and hereinabove described are arranged as shown in Figures 5 and 6, wherein the sockets 26 of the bars 25 are engaged with the lugs 12 of the clamps 4, the sockets 26 being designed to snugly fit these lugs 12 as well as to snugly fit the uprights 15. As shown in Figures 5 and 6 when the luggage carrier is converted into a table, the sockets 26 of the bars 25 are not only engaged with the lugs 12 of the clamps 4 but the sockets 16 and uprights 15 are engaged with the bars 25 and the uprights are disposed in a horizontal position and are supported on the bars 25. The runs of the rope 21 in the arrangement shown in Figs. 5 and 6 are horizontally disposed and provide a supporting surface which may be readily used as a table or platform. It will be understood that the sockets 16 are designed to snugly engage the bars 25 as well as the lugs 12.

I claim:

1. A luggage carrier adapted for use on the running boards of automobiles and comprising a plurality of uprights, means interengaged with the uprights and adapted to be fastened to the running board for supporting the uprights, a flexible element having runs extending back and forth between the uprights, means on the uprights for connecting the flexible element thereto, and means for closing an end of the carrier and comprising a plurality of spaced and horizontally extending bars, said bars having vertically disposed sockets engageable with an upright to support the bars and engageable with each other to maintain the bars in spaced relation.

2. A convertible luggage carrier and table for use on automobiles and comprising a plurality of clamps adapted to be engaged with the running board, said clamps having mounting lugs, uprights having sockets designed to receive the lugs, a flexible element having runs extending back and forth between the uprights, means on the uprights for connecting the flexible elements thereto, a plurality of bars having sockets designed to be engaged with an upright to provide a closure for one end of the carrier, the sockets of the bars being also designed to engage the lugs when the luggage carrier is converted into a table, the sockets of the uprights being engageable with the bars when the luggage carrier is converted into a table.

3. In a device of the character described, a plurality of clamps having mounting lugs, a plurality of uprights having sockets adapted to engage said lugs; a plurality of bars having sockets adapted to engage an upright, the sockets of the bars being adapted to engage the lugs, the sockets of the uprights being adapted to engage the bars.

WILLIAM KADLETZ.